United States Patent [19]

Ikemoto et al.

[11] 4,360,094

[45] Nov. 23, 1982

[54] GEAR STRUCTURE FOR A MANUAL TRANSMISSION FOR AN AUTOMOBILE

[75] Inventors: Kazuhito Ikemoto; Nobuaki Katayama; Yukio Terakura, all of Toyota; Kan Sasaki, Aichi, all of Japan

[73] Assignee: Toyota Jidosha Kogyo Kabushiki Kaisha, Toyota, Japan

[21] Appl. No.: 214,764

[22] Filed: Dec. 9, 1980

[30] Foreign Application Priority Data

Aug. 20, 1980 [JP] Japan ............................ 55-118556[U]

[51] Int. Cl.³ ............................................. F16D 23/06
[52] U.S. Cl. ...................................... 192/53 F; 74/339
[58] Field of Search ........................... 192/53 F; 74/339

[56] References Cited

U.S. PATENT DOCUMENTS

| | | | |
|---|---|---|---|
| 2,070,140 | 2/1937 | Peterson et al. | 192/53 F |
| 3,620,338 | 11/1971 | Tomita et al. | 192/53 F |
| 3,631,952 | 1/1972 | Sugimoto et al. | 192/53 F |

FOREIGN PATENT DOCUMENTS 223237 11/1942 Switzerland ....................... 192/53 F

*Primary Examiner*—Allan D. Herrmann
*Attorney, Agent, or Firm*—Stevens, Davis, Miller & Mosher

[57] ABSTRACT

A gear structure for a manual transmission for an automobile which has a shaft rotatably supported in a transmission case, a clutch hub rotatable with the shaft and having a spline on its outer periphery, a clutch hub sleeve splinedly engaged with the spline of the clutch hub and movable in its axial direction by shifting operation of the transmission, a speed change gear freely rotatably mounted on the shaft and having a boss contacting the clutch hub and a gear spline formed independently of the speed change gear and fixed on the boss of the speed change gear. The gear spline has spline teeth on its outer periphery, and the clutch hub sleeve is splinedly engageable with the gear spline upon the shifting operation of the transmission. The gear structure comprises an annular projection formed on the outer periphery of the gear spline integrally with the spline teeth to project toward the speed change gear and an annular depression formed on one side of the speed change gear for receiving the annular projection therein.

3 Claims, 2 Drawing Figures

4,360,094

GEAR STRUCTURE FOR A MANUAL TRANSMISSION FOR AN AUTOMOBILE

BACKGROUND OF THE INVENTION

1. Field of the Invention

The present invention relates to a gear structure for a manual transmission for an automobile, and more particularly, it relates to a gear structure in which a gear spline engaged with inner teeth of a clutch hub sleeve upon shifting operation and a speed change gear are separately formed and thereafter connected with each other.

2. Description of the Prior Art

In a conventional gear structure of the aforementioned type, the face width of the spline teeth of the gear spline is made large to increase the strength of the gear spline. However, when the face width of the spline teeth is thus made large, the longitudinal size, i.e., the full length of the manual transmission is necessarily increased to take up the space therefor.

SUMMARY OF THE INVENTION

It is an object of the present invention to provide a gear structure for a manual transmission for an automobile in which a gear spline is strengthened without increasing the full length of the manual transmission.

It is another object of the present invention to provide a gear structure for a manual transmission for an automobile in which the face width of spline teeth of a gear spline is made large to strengthen the gear spline without decreasing the longitudinal size of the manual transmission and thereby saving the space therefor.

DESCRIPTION OF THE PREFERRED EMBODIMENT

Figure 1:
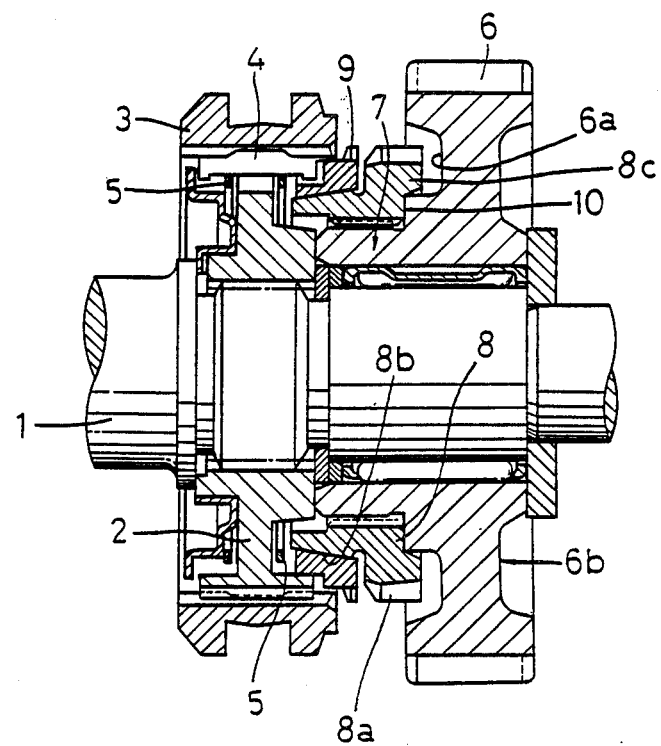
FIG. 1 is a cross sectional view of a part of the manual transmission to which the structure according to the present invention is applied.

Referring now to FIG. 1 of the drawings in which a part of a manual transmission for an automobile, i.e., a fifth speed synchronizer is shown in section, numeral 1 indicates a shaft rotatably supported in a transmission case (not shown) including an extension housing. The shaft 1 is provided with a clutch hub 2 which is rotatable therewith, and a clutch hub sleeve 3 is splinedly engaged with the outer periphery of the clutch hub 2 to move in the axial direction by shifting operation of the transmission. Within the clutch hub sleeve 3, there is provided a conventional shifting key 4, which is pressed against the inner periphery of the clutch hub sleeve 3 by a pair of key springs 5.

In the right-hand direction in FIG. 1 of the clutch hub 2, there is provided a fifth speed gear 6 to be freely rotatable with respect to the shaft 1. The fifth speed gear 6 is provided on both sides with annular depressions 6a and 6b. The fifth speed gear 6 further has a boss 7 in the vicinity of the clutch hub 2, and a gear spline 8 formed independently of the gear 6 is fixed to the outer periphery of the boss 7 by a means such as serration insertion under pressure. At the time of insertion, the axial position of the gear spline 8 with respect to the boss 7 of the fifth speed gear 6 is defined by a stop surface 10.

Figure 2:
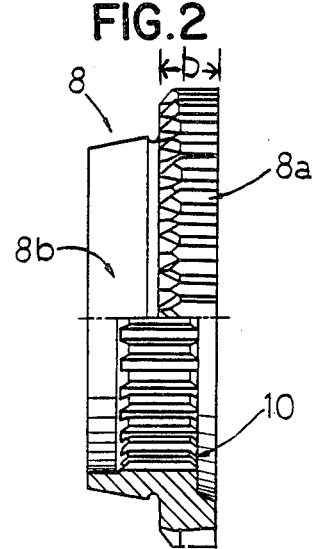
FIG. 2 is a partial cross sectional view of a gear spline.

The gear spline 8 is provided on its outer periphery with spline teeth 8a which are engaged with inner teeth of the hub sleeve 3 when the fifth speed shifting operation is conducted. As shown in FIG. 2, the outer peripheral portion 8c of the gear spline 8 having the spline teeth 8a projects toward the gear 6 from the stop surface 10 to be received in the annular depression 6a of the gear 6. A tapered conical surface 8b integrally formed with the gear spline 8 is provided on its outer periphery with a synchronizer ring 9.

When the fifth speed shifting operation is conducted, the clutch hub sleeve 3 moves in the right-hand direction in FIG. 1 through operation of a shift fork (not shown). Consequently, the shaft 1 and the fifth speed gear 6 are synchronizedly rotated in a well-known manner by the shifting key 4 and the synchronizer ring 9, and thereafter the inner teeth of the clutch hub sleeve 3 are engaged with the spline teeth 8a of the gear spline 8 to complete the shifting operation. The face width b of the spline teeth 8a engaged with the inner teeth of the clutch hub sleeve 3 is sufficiently made large in excess of the extent of effective engagement with the clutch hub sleeve 3. Further, since such increase in the face width of the spline teeth 8a is performed, as hereinabove described, by projecting the spline teeth 8a in the annular depression 6a of the fifth speed gear 6, the longitudinal size of the manual transmission is not influenced thereby.

While the invention has been described with reference to a preferred embodiment thereof, it is to be understood that modifications or variations may be easily made without departing from the scope of this invention which is defined by the appended claims.

What is claimed is:

1. In combination with a vehicular transmission having a shaft rotatably supported in a transmission case, a clutch hub rotatable with said shaft and having a spline on its outer periphery, a clutch hub sleeve being splinedly engaged with said spline of said clutch hub and movable in its axial direction by shifting operation of said transmission, a speed change gear freely rotatably mounted on said shaft and having a boss contacting said clutch hub, a gear spline formed independently of said speed change gear and being fixed on said boss of said speed change gear, an annular depression defined in said speed change gear, said gear spline being annular and comprising gear teeth on its radially outer periphery, said gear spline being positioned between said clutch hub and said speed change gear, the radially outer end of the side of said gear spline facing said speed change gear and projecting axially outwardly beyond the radially inner end of that side and extending axially into said depression, said teeth being selectively engageable and driven by said clutch hub sleeve and extending axially from one end thereof external of said speed change gear into said annular depression.

2. In combination with a vehicular transmission having a shaft rotatably supported in a transmission case, a clutch hub rotatable with said shaft and having a spline on its outer periphery, a clutch hub sleeve being splinedly engaged with said spline of said clutch hub and movable in its axial direction by shifting operation of said transmission, a speed change gear freely rotatably mounted on said shaft and having a boss contacting said clutch hub, said boss extending along the axis of said shaft and away from said speed change gear to contact said clutch hub, a gear spline formed independently of said speed change gear and being fixed on the outer periphery of said boss, an annular depression defined in said speed change gear, said gear spline being annular and comprising gear teeth on its radially outer periphery, said gear spline being positioned between said clutch hub and said speed change gear, the radially outer end of the side of said gear spline facing said speed change gear and projecting axially outwardly beyond the radially inner end of that side and extending axially into said depression, said teeth being selectively engageable and driven by said clutch hub sleeve and extending axially from one end thereof external of said speed change gear into said annular depression.

3. The invention as defined in claims 1 or 2 wherein said gear spline is fixed to said outer periphery of said boss of said speed change gear by serration insertion under pressure.

* * * * *